US009182549B2

(12) United States Patent
Wurster et al.

(10) Patent No.: US 9,182,549 B2
(45) Date of Patent: Nov. 10, 2015

(54) OPTICAL COUPLING SYSTEM FOR TWO OPTICAL WAVEGUIDES

(75) Inventors: Clemens Wurster, Augsburg (DE); Gregor Langer, Wolfnitz (AT); Stefan Schmidt, Waging (DE); Hannes Stahr, St. Lorenzen (AT)

(73) Assignees: Rosenberger-OSI GmbH & CO. OHG, Augsburg (DE); AT&S AG, Leoben (AT)

( * ) Notice: Subject to any disclaimer, the term of this patent is extended or adjusted under 35 U.S.C. 154(b) by 218 days.

(21) Appl. No.: 14/110,053

(22) PCT Filed: Apr. 4, 2012

(86) PCT No.: PCT/EP2012/001503
§ 371 (c)(1),
(2), (4) Date: Oct. 29, 2013

(87) PCT Pub. No.: WO2012/136365
PCT Pub. Date: Oct. 11, 2012

(65) Prior Publication Data
US 2014/0050442 A1    Feb. 20, 2014

(30) Foreign Application Priority Data

Apr. 7, 2011 (EP) .................................. 11002933

(51) Int. Cl.
*G02B 6/26* (2006.01)
*G02B 6/36* (2006.01)
*G02B 6/30* (2006.01)
*G02B 6/42* (2006.01)

(52) U.S. Cl.
CPC *G02B 6/262* (2013.01); *G02B 6/30* (2013.01); *G02B 6/423* (2013.01); *G02B 6/4228* (2013.01)

(58) Field of Classification Search
CPC .......... G02B 6/30; G02B 6/122; G02B 6/262; G02B 6/42; G02B 6/4228; G02B 6/423
USPC ..................... 385/14, 49–53, 88–92
See application file for complete search history.

(56) References Cited

U.S. PATENT DOCUMENTS

| 5,071,215 A | 12/1991 | Hockaday |
| 5,703,980 A | 12/1997 | Macelwee et al. |
| 6,217,231 B1 | 4/2001 | Mesaki et al. |
| 7,162,126 B2 * | 1/2007 | Takagi et al. ............ 385/49 |

FOREIGN PATENT DOCUMENTS

| DE | 196 44 758 A1 | 4/1998 | |
| JP | 2001091794 | * 4/2001 | ........ G02B 6/42 |
| JP | 20010091794 A | 4/2001 | |

* cited by examiner

*Primary Examiner* — Akm Enayet Ullah
*Assistant Examiner* — Michael Mooney
(74) *Attorney, Agent, or Firm* — Robert Curcio; DeLio, Peterson & Curcio, LLC

(57) ABSTRACT

An optical coupling system for coupling a first optical waveguide having a first core surrounded by a first sheath to a second optical waveguide having a second core surrounded by a second sheath. An end face of the first core of the first optical waveguide abuts an end face of the second core of the second optical waveguide at a coupling location and the second core is flush with the first core in the axial direction, wherein, in the region of the coupling location, over at least part of a predetermined axial portion, both the second sheath of the second optical waveguide and the first sheath of the first optical waveguide together form a cladding of the optical waveguide in the predetermined portion.

8 Claims, 5 Drawing Sheets

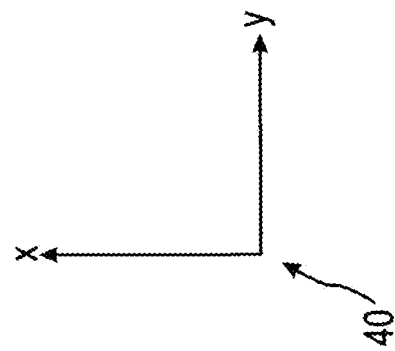
Fig. 5
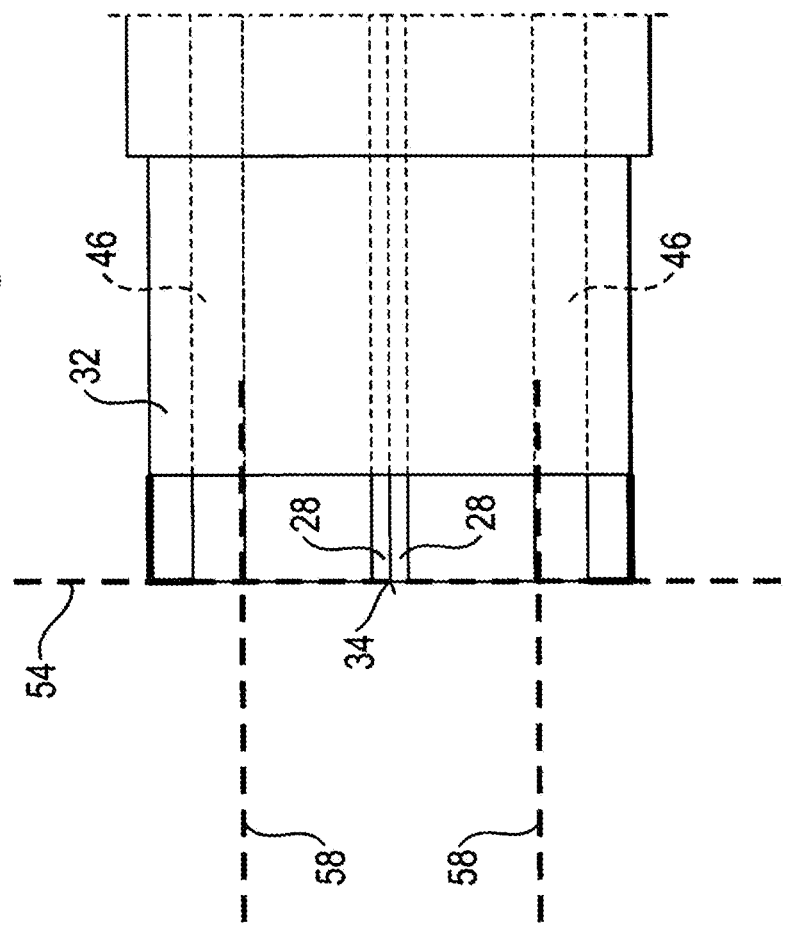

OPTICAL COUPLING SYSTEM FOR TWO OPTICAL WAVEGUIDES

BACKGROUND OF THE INVENTION

1. Field of the Invention

The present invention relates to an optical coupling system for coupling a first optical waveguide, which has a first core surrounded by a first sheath, to a second optical waveguide which has a second core surrounded by a second sheath, where in the region of the coupling location, over at least part of a predetermined axial portion, both the second sheath and the first sheath together form a cladding of the optical waveguide, and where the first optical waveguide is preferably a polymer optical waveguide formed on a printed circuit board.

2. Description of Related Art

Printed circuit boards with integrated optical signal connections represent the next generation of signal connection on board level. The so-called optoelectronic printed circuit board is designed to allow the realization of highly complex applications which require further miniaturization as well as an increase in the integration density of product features and consequently make it possible to achieve a higher product added value of the printed circuit board. Printed circuit boards with optical connections will be used where applications require extremely high data flows between components, modules or functional units (e.g. high-end computer applications), resistance to interference from electromagnetic fields (e.g. automotive and aeronautic applications) or a space-saving design of the connection lengths (e.g. mobile applications), or where a saving in energy in comparison with resistive copper conductor traces is desired.

Optical data transmission in the long-distance range has already been known for several decades. For example, optical fibers or optical waveguides (OWG/LWL) have already been used for data transfer in continental, metropolitan and "local area" networks for many years. The use of optical waveguides in order to connect together printed circuit boards, or even to realize integrated optical connections within a printed circuit board, is thus the next step. Glass or polymer fibers are used as optical waveguides, as are planar polymer waveguides, into which research is still being conducted. Although planar polymer waveguides are inferior to glass fibers in terms of optical attenuation, which is acceptable over short distances, for example where used on printed circuit boards, these have enormous advantages in terms of processability and manufacturability, miniaturization, design freedom, and cost.

The biggest challenge in the realization of integrated optical connections on the printed circuit board by means of optical waveguides (planar waveguide technology) is the connection of the waveguide ends to optoelectronic components or to optical connector modules which create the connection to the "outside world," for example to external glass fiber cables.

SUMMARY OF THE INVENTION

Bearing in mind the problems and deficiencies of the prior art, it is therefore an object of the invention to improve a coupling of two optical waveguides.

This object is accomplished according to the present invention through an optical coupling system of the aforementioned type with the features characterized in the claims.

According to the invention, in an optical coupling system of the aforementioned type, an end face of the first core of the first optical waveguide abuts an end face of the second core of the second optical waveguide at a coupling location and the second core is flush with the first core in the axial direction, wherein, in the region of the coupling location, over at least part of a predetermined axial portion, both the second sheath of the second optical waveguide and the first sheath of the first optical waveguide together form a cladding of the optical waveguide in the predetermined portion.

This has the advantage that the two optical waveguides which are to be coupled can be exactly aligned in relation to one another in at least two directions in space by simply pushing them together.

The above and other objects, which will be apparent to those skilled in the art, are achieved in the present invention which is directed to in a first aspect an optical coupling system for coupling a first optical waveguide to a second optical waveguide, the optical coupling system comprising: the first optical waveguide including a first core surrounded by a first sheath, and the second optical waveguide including a second core surrounded by a second sheath wherein an end face of the first core of the first optical waveguide abuts an end face of the second core of the second optical waveguide at a coupling location such that the second core is flush with the first core in the axial direction, wherein, in the region of the coupling location, over at least part of a predetermined axial portion, both the second sheath of the second optical waveguide and the first sheath of the first optical waveguide together form a cladding of the optical waveguide in the predetermined axial portion, the first optical waveguide being a polymer optical waveguide formed on a printed circuit board including a polymer core surrounded by a polymer sheath; the second optical waveguide being embedded in a ferrule with at least one first guide device being arranged on the ferrule and at least one second guide device being arranged on the printed circuit board, the first and second guide device interact to effect an axially aligned positioning of the second core and of the first core in at least one direction in space, the second guide device being manufactured of the same material as the polymer optical waveguide.

The second optical waveguide is preferably an optical waveguide which is external in relation to the printed circuit board, including a sheath and an optical waveguide core.

The second core is exposed in the predetermined axial portion and stripped of the second sheath such that a first surface of the second core originally facing the second sheath is exposed, and including having the first optical waveguide stripped of a part of the first sheath and the first core such that a remaining part of the first sheath is exposed, with a second surface originally facing the first core, wherein the first surface of the second core is in contact with the second surface of the first sheath.

At least in a part of the predetermined axial portion, the first core is stripped of the first sheath such that a third surface of the first core originally facing the first sheath is exposed, and the second optical waveguide is stripped of a part of the second sheath and the second core such that a remaining part of the second sheath of the second optical waveguide is exposed, with a fourth surface originally facing the second core, wherein the third surface of the first core is in contact with the fourth surface of the second sheath of the second optical waveguide.

BRIEF DESCRIPTION OF THE DRAWINGS

The features of the invention believed to be novel and the elements characteristic of the invention are set forth with particularity in the appended claims. The figures are for illustration purposes only and are not drawn to scale. The inven

FIG. 5 shows a diagrammatic top view of an exemplary embodiment of a ferrule with glass fiber optical waveguide which is only represented diagrammatically in FIGS. 2 and 3.

DESCRIPTION OF THE PREFERRED EMBODIMENT(S)

In describing the preferred embodiment of the present invention, reference will be made herein to FIGS. 1-5 of the drawings in which like numerals refer to like features of the invention.

A coupling of optical planar polymer waveguides on a printed circuit board with glass or polymer fibers is realized in that the first optical waveguide is a polymer optical waveguide, formed on a printed circuit board, which possesses a polymer core surrounded by a polymer sheath.

An additional axial alignment of the optical waveguides which are to be coupled is achieved in that the second optical waveguide is embedded in a ferrule, at least one first guide device being arranged on the ferrule, at least one second guide device being arranged on the printed circuit board, and the first and second guide device being so designed that these interact so as to effect an axially aligned positioning of the second core and of the first core in at least one direction in space.

A simple manufacture of the second guide device, possibly simultaneously in the same manufacturing process as used for the polymer optical waveguide, in particular a lithographic process, is achieved in that the second guide device is manufactured of the same material as the polymer optical waveguide.

A coupling of optical planar polymer waveguides on a printed circuit board with external signal-processing devices is achieved in that the second optical waveguide is an optical waveguide which is external in relation to the printed circuit board, with a sheath and an optical waveguide core, in particular a glass fiber or polymer fiber optical waveguide.

A particularly simple and yet precise manufacture of contact surfaces for the exact positioning of the optical waveguides which are to be coupled is achieved in that, at least in a part of the predetermined axial portion, the second core is stripped of the second sheath such that a first surface of the second core originally facing the second sheath is exposed, and the first optical waveguide is stripped of a part of the first sheath and the first core such that a remaining part of the first sheath is exposed, with a second surface originally facing the first core, wherein the first surface of the second core is in contact with the second surface of the first sheath.

A further simplification of the exact positioning of the optical waveguides which are to be coupled is achieved in that, at least in a part of the predetermined axial portion, the first core is stripped of the first sheath such that a third surface of the first core originally facing the first sheath is exposed, and the second optical waveguide is stripped of a part of the second sheath and the second core such that a remaining part of the second sheath of the second optical waveguide is exposed, with a fourth surface originally facing the second core, wherein the third surface of the first core is in contact with the fourth surface of the second sheath of the second optical waveguide.

Figure 1:
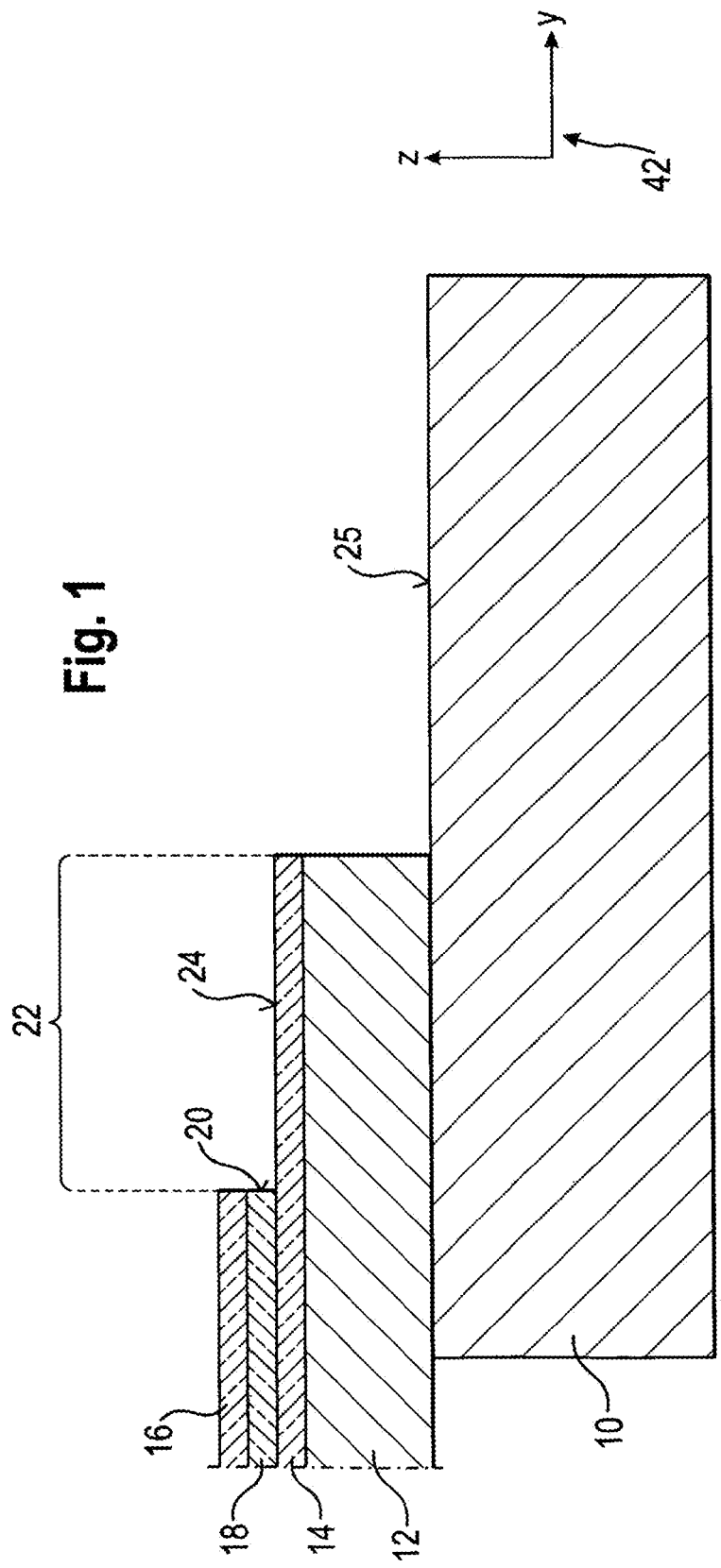
- FIG. 1 shows a diagrammatic partial view of a polymer optical waveguide on a printed circuit board.

FIG. 1 shows a polymer optical waveguide which is formed on a printed circuit board with a rigid substrate 10 and a further layer 12. Alternatively, the layers 10, 12 can also be made of a part of the printed circuit board. The polymer optical waveguide is built up on the layer 12 as a planar structure and comprises a first polymer sheath 14 as well as a second polymer sheath 16 between which a polymer core 18 is arranged. The polymer core 18 and the polymer sheaths 14, 16 are manufactured of the same polymeric material. The material of the polymer core 18 has a higher refractive index than the material of the polymer sheaths 14, 16, thus defining the optical waveguide.

According to the invention, the polymer optical waveguide is stripped of the second polymer sheath 16 and the polymer core 18 in the vicinity of an end face 20 of the polymer core 18 over a part 22 of a predetermined axial portion 23 (FIG. 2), so that a second surface 24 of the first polymer sheath 14, which originally faced the polymer core 18, is exposed. Alternatively, the polymer optical waveguide is manufactured directly with a corresponding "step".

Figure 2:
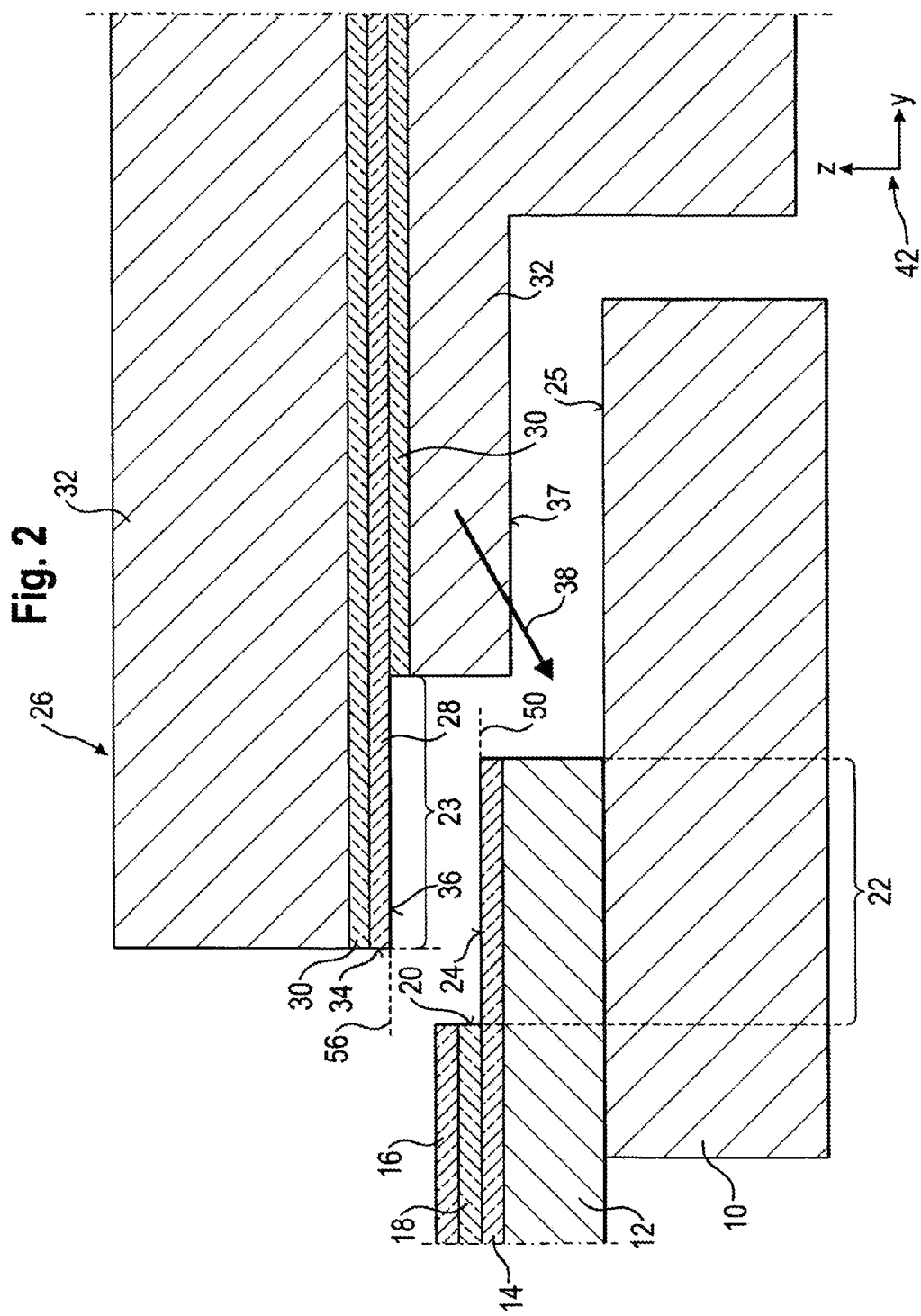
FIG. 2 shows a diagrammatic partial view of an exemplary embodiment of an optical coupling system according to the invention in a first state of assembly.

FIG. 2 illustrates a glass fiber optical waveguide 26 with a glass fiber core 28 and a sheath 30, which is arranged in a ferrule 32. According to the invention, the glass fiber optical waveguide 26 is stripped of a part of the sheath 30 over a predetermined axial portion 23, which is longer in the axial direction than the part 22 of the predetermined axial portion 23, in the vicinity of an end face 34 of the glass fiber core 28, so that a first surface 36 of the glass fiber core 28, which originally faced the sheath 30, is exposed.

Figure 3:
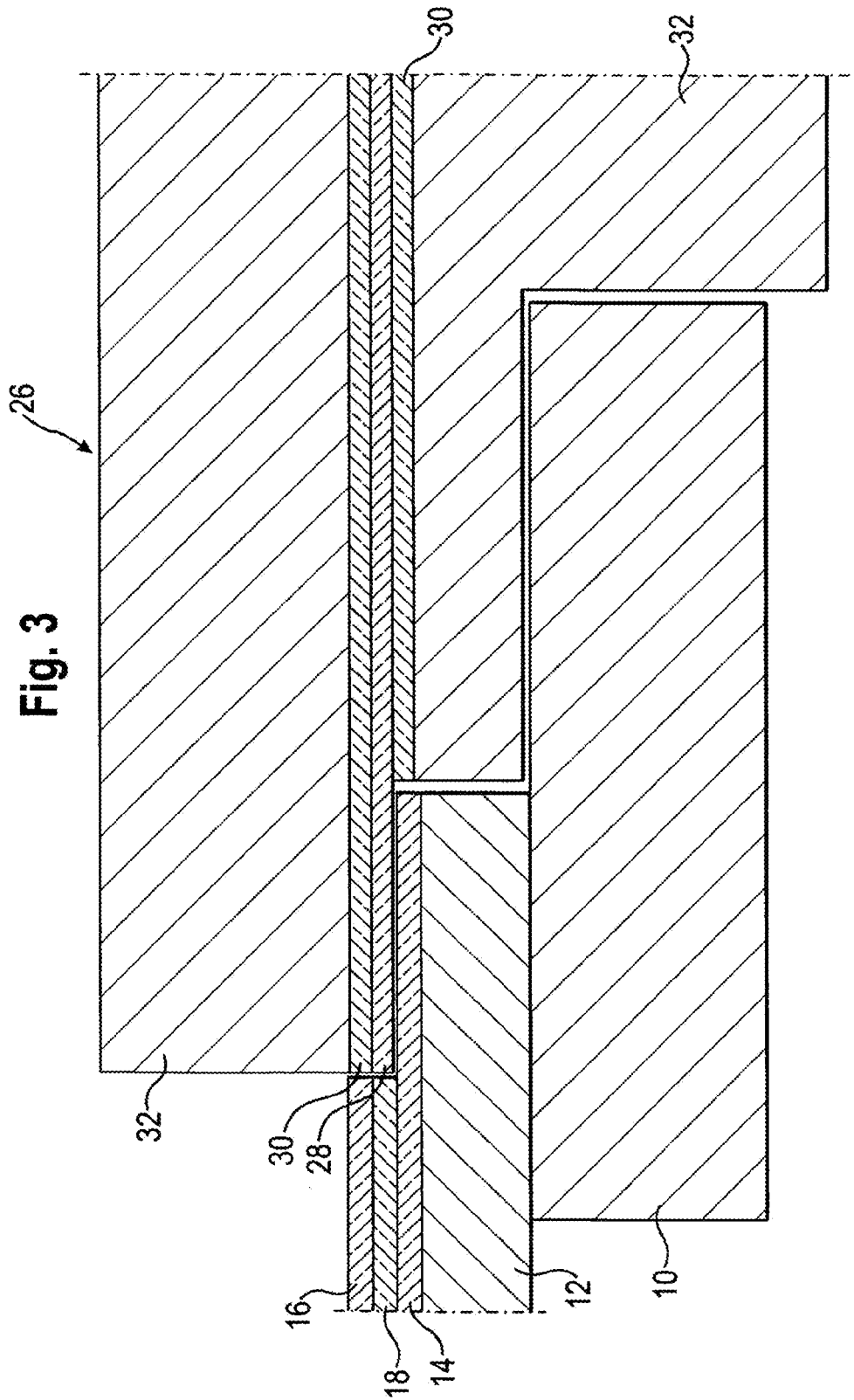
FIG. 3 shows a diagrammatic partial view of the embodiment of the optical coupling system according to the invention as shown in FIG. 2 in a second state of assembly.

In order to manufacture a coupling system according to the invention which connects the polymer optical waveguide 14, 16, 18 and the glass fiber optical waveguide 26 optically, so as to conduct light, the ferrule 32 with the glass fiber optical waveguide 26 prepared as described above is pushed onto the printed circuit board 10, 12 with the polymer optical waveguide 14, 16, 18 prepared as described above, as indicated by the arrow 38 in FIG. 2, so that the first and second surface 24, 36 face one another or contact one another. This condition is illustrated in FIG. 3. Optionally, for optical connection an adhesive layer (not shown) is, in addition, arranged between the end face 20 of the polymer core 18 and the end face 34 of the glass fiber core 28. According to the invention, the glass fiber core 28 is thus coupled directly with the polymer core 18. Optionally, for mechanical connection an adhesive layer is provided between a surface 25 of the rigid substrate 10 and a surface 37 of the ferrule 32.

In other words, the polymer optical waveguide 14, 16, 18 is stepped in form over the part 22 and the glass fiber optical waveguide 26 is stepped in form over the portion 23, wherein the portion 23 is longer than the part 22. As a result, the end faces 20, 34 contact one another reliably.

Figure 4:
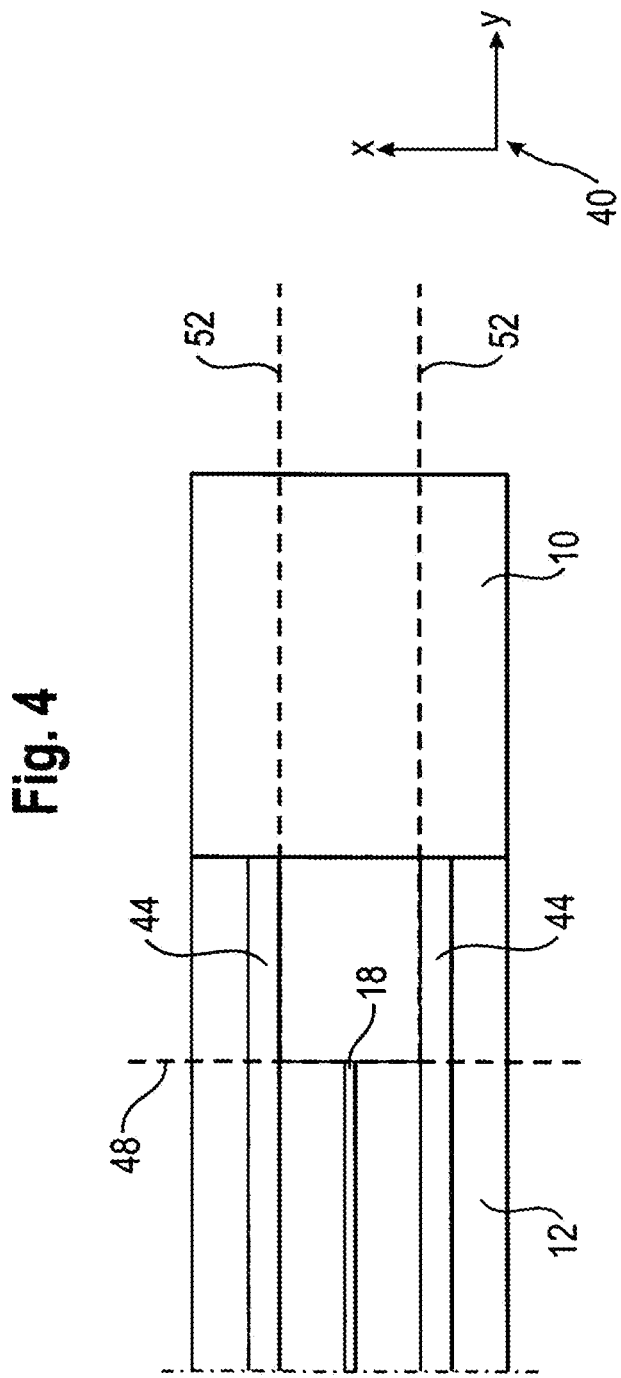
FIG. 4 shows a top view of the polymer optical waveguide on a printed circuit board as shown in FIG. 1.

FIG. 4 shows a top view of the printed circuit board 10, 12 with polymer optical waveguide. An x-y coordinate axis 40 in FIG. 4 represents two directions in space, namely an x-direction and a y-direction which are perpendicular to one another and which are arranged on the plane of representation in FIG. 4. A third direction z is oriented perpendicular to the plane of representation in FIG. 4. This can be seen from a z-y coordinate axis 42 in FIGS. 1 and 2. The second surface 24 ensures an exact positioning of the two optical waveguides which are to be coupled in the z-direction. The abutting end faces 20, 34 ensure an exact positioning of the two optical waveguides which are to be coupled in the y-direction.

To ensure the exact positioning of the two optical waveguides which are to be coupled in the x-direction, lateral guide structures 44 are formed on the printed circuit board or the layer 12 of the printed circuit board, as can be seen from FIG. 4. These lateral guide structures 44 interact with guide bores 46 which are formed in the ferrule 32, as can be seen from FIG. 5.

The invention relates to a pluggable optical interface and proceeds from the printed circuit board 10, 12 with the planar polymer waveguide system 14, 16, 18, this having a special step design on the waveguide end which is to be coupled with an optical fiber. In the embodiment shown, the second component of the optical coupling system which is to be connected, optically and mechanically, with the polymer optical waveguide system 14, 16, 18, is an MT ferrule (standardized in accordance with IEC 61754-5) or a similar element connected, in a conventional manner, with at least one glass fiber system 30, 34, wherein the ferrule 32 with the glass fiber optical waveguide system 30, 34 and the polymer optical waveguide system 14, 16, 18 are finished in such a way that these are of stepped design (FIGS. 1 and 2). Both components (printed circuit board 10, 12 and, by way of example, the MT ferrule 32) can now be pushed into one another precisely, so that an optimal optical coupling between the polymer waveguide 14, 16, 18 on the printed circuit board 10, 12 and the glass fiber waveguide 26 in the MT ferrule 32 used by way of example is achieved. For fixing purposes, the two components are, for example, glued together, i.e. the polymer waveguide 14, 16, 18 is glued onto the printed circuit board 10, 12 and glass fiber waveguide 26 is glued into the ferrule 32.

Both components possess the following properties: end faces of the waveguide or end faces 20, 34 of the polymer core 18 and of the optical waveguide core 28 with very high optical qualities, reference marks or guides 44, 46, so that the components are aligned exactly in relation to the waveguides and cavities in the printed circuit board (see surface 25), into which the components are mechanically fixed. This concept is suitable for both multimode and single-mode optical waveguides.

According to the invention an interface concept (optical coupling system) is thus suggested which involves a direct optical coupling between the planar polymer waveguide 14, 16, 18 on the printed circuit board 10, 12 and a glass fiber waveguide 26, for example in an MT ferrule 32.

The printed circuit board 10, 12 is equipped with planar optical waveguides 14, 16, 18. It comprises the rigid substrate 10, for example FR4, and a further layer 12, which is also rigid, or can also be flexible, for example being made of polyimide. Applied to the layer 12 are the optical waveguides 14, 16, 18, which possess a polymer sheath (cladding) 14 applied in a planar manner, a structured waveguide core or polymer core 18 and a further polymer sheath (cladding) 16, applied in a planar manner. The polymer sheaths or cladding layers 14 and 16 are manufactured of the same material. The material of the waveguide core 18 has a higher refractive index than the material of the cladding layers 14, 16, which defines the polymer optical waveguide. Lateral guide structures 16, made of the same material and produced by means of the same lithographic process as the polymer optical waveguides 14, 16, 18 are also applied.

The printed circuit board 10, 12 is structured in such a way the following three structural features precisely define the position of a component which is to be coupled relative to the polymer waveguide core 18: the position in the y-direction is defined by means of a first level 48 (FIGS. 4, 5) in that the part to be coupled is guided up to the point of contact with the end face 20. The position in the z-direction is adjusted by means of a second level 50 (FIG. 2) which is defined by the second surface 24. The position in the x-direction is adjusted by means of a third level 52 or the lateral guide structures 44. Since these three positioning structures 48, 50 and 52 are not determined indirectly by means of markers, but are directly connected with the waveguide structures, a very precise alignment between the optical waveguides which are to be coupled is realized.

An exemplary embodiment of a glass fiber optical waveguide is a standard MT ferrule 32, as shown in FIG. 5. This standard MT ferrule 32 possesses guide bores 46. In addition, it is polished on the end face in a known manner so that the fibers fitted in the ferrule 32 also have an optically high-quality face surface at the ends 34. An additional feature of the ferrule 32 is the step, which is for example produced through grinding and polishing, wherein the depth of the step is defined through the upper side 36 of the fiber core 28, and thus forms a fourth level 54. In a coupling with the polymer optical waveguide 14, 16, 18 on the printed circuit board 10, 12 the fourth level 54 defines the position in the y-direction and is thus the counterpart to the first level 48. A fifth level 56 (FIG. 2) defines the position in the z-direction and is the counterpart to the second level 50. Sixth levels 58, and thus the position in the x-direction (counterpart to the third level 52), are defined through the very precisely formed guide bores 46 already present in the MT ferrule 32.

The two components ferrule 32 and printed circuit board 10, 12 can be easily pushed onto one another and now form the optical coupling system. The polymer core 18 of the planar polymer optical waveguide 14, 16, 18 on the printed circuit board 19, 12 and the glass fiber cores 28 of the glass fibers in the MT ferrule 32 are positioned exactly relative to one another in the positions x, y and z. The two components can be glued together in the contact region between the two surfaces 25 and 37 in order to improve mechanical stability. An optical adhesive with a refractive index matching the waveguide cores 18, 28 can also be applied between the planar waveguide end (end face 20) and fiber end (end face 34), preventing the formation of an air gap.

The invention makes it possible for an optical printed circuit board (printed circuit board 10, 12 with planar optical polymer optical waveguide 14, 16, 18) to be passively optically coupled with glass or polymer fiber of a glass fiber optical waveguide via a modified standard MT ferrule 32 or an element of similar design. This optical interface allows optical printed circuit boards, which will play an increasingly important role in optical data transmission in the future, to be coupled with standard optical fibers such as have already been in use for decades.

This invention can be used for all optical applications in which a polymer waveguide is to be connected to the printed circuit board via a coupling module with, for example, an optical fiber. The scope of application ranges from data transmission solutions in the field of high end computers and fiber-to-the-home applications to optical coupling systems for the entertainment sector.

According to the invention, a passive coupling system between an optical fiber and a polymer waveguide on a printed circuit board with structures for precise three-dimensional alignment, i.e. in three mutually perpendicular directions, is provided.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An optical coupling system for coupling a first optical waveguide to a second optical waveguide, said optical coupling system comprising:

said first optical waveguide including a first core surrounded by a first sheath, and said second optical waveguide including a second core surrounded by a second sheath wherein an end face of the first core of the first optical waveguide abuts an end face of the second core of the second optical waveguide at a coupling location such that the second core is flush with the first core in the axial direction, wherein, in the region of the coupling location, over at least part of a predetermined axial portion, both the second sheath of the second optical waveguide and the first sheath of the first optical waveguide together form a cladding of the optical waveguide in the predetermined axial portion, said first optical waveguide being a polymer optical waveguide formed on a printed circuit board including a polymer core surrounded by a polymer sheath;

said second optical waveguide being embedded in a ferrule with at least one first guide device being arranged on the ferrule and at least one second guide device being arranged on the printed circuit board, the first and second guide device interact to effect an axially aligned positioning of the second core and of the first core in at least one direction in space, the second guide device being manufactured of the same material as the polymer optical waveguide.

2. The optical coupling system of claim 1, wherein the second optical waveguide is an optical waveguide which is external in relation to the printed circuit board, including a sheath and an optical waveguide core.

3. The optical coupling system of claim 1, including having the second core exposed in the predetermined axial portion and stripped of the second sheath such that a first surface of the second core originally facing the second sheath is exposed, and including having the first optical waveguide stripped of a part of the first sheath and the first core such that a remaining part of the first sheath is exposed, with a second surface originally facing the first core, wherein the first surface of the second core is in contact with the second surface of the first sheath.

4. The optical coupling system of claim 1 wherein at least in a part of the predetermined axial portion, the first core is stripped of the first sheath such that a third surface of the first core originally facing the first sheath is exposed, and the second optical waveguide is stripped of a part of the second sheath and the second core such that a remaining part of the second sheath of the second optical waveguide is exposed, with a fourth surface originally facing the second core, wherein the third surface of the first core is in contact with the fourth surface of the second sheath of the second optical waveguide.

5. The optical coupling system of claim 2 wherein said second optical waveguide comprises a glass fiber or polymer fiber optical waveguide.

6. The optical coupling system of claim 2, including having the second core exposed in the predetermined axial portion by stripping the second sheath such that a first surface of the second core originally facing the second sheath is exposed, and including having the first optical waveguide stripped of a part of the first sheath and the first core such that a remaining part of the first sheath is exposed, with a second surface originally facing the first core, wherein the first surface of the second core is in contact with the second surface of the first sheath.

7. The optical coupling system of claim 2 wherein at least in a part of the predetermined axial portion, the first core is stripped of the first sheath such that a third surface of the first core originally facing the first sheath is exposed, and the second optical waveguide is stripped of a part of the second sheath and the second core such that a remaining part of the second sheath of the second optical waveguide is exposed, with a fourth surface originally facing the second core, wherein the third surface of the first core is in contact with the fourth surface of the second sheath of the second optical waveguide.

8. The optical coupling system of claim 3 wherein at least in a part of the predetermined axial portion, the first core is stripped of the first sheath such that a third surface of the first core originally facing the first sheath is exposed, and the second optical waveguide is stripped of a part of the second sheath and the second core such that a remaining part of the second sheath of the second optical waveguide is exposed, with a fourth surface originally facing the second core, wherein the third surface of the first core is in contact with the fourth surface of the second sheath of the second optical waveguide.

* * * * *